C. L. HOLLAND.
Nut-Lock.

No. 162,167. Patented April 20, 1875.

WITNESSES:
John R. Heard
David Somerville

INVENTOR:
Charles L. Holland.
by Alban Andrén, atty.

THE GRAPHIC CO. PHOTO-LITH. 39 & 41 PARK PLACE, N.Y.

United States Patent Office.

CHARLES L. HOLLAND, OF IPSWICH, MASSACHUSETTS, ASSIGNOR OF ONE-HALF HIS RIGHT TO JOHN J. SULLIVAN, OF SAME PLACE.

IMPROVEMENT IN NUT-LOCKS.

Specification forming part of Letters Patent No. 162,167, dated April 20, 1875; application filed May 27, 1874.

*To all whom it may concern:*

Be it known that I, CHARLES L. HOLLAND, of Ipswich, in the county of Essex and State of Massachusetts, have invented certain new and useful Improvements in Rail-Fasteners; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to improvements in methods of locking nuts to fish-plates for rails that are exposed to jarring, or for the purpose of locking and securing nuts to other articles similarly exposed; and my invention consists in the employment of a nut serrated on its under side, in combination with a serrated surface on the fish-plate, and an elastic washer placed between the serrated edges of the nut and fish-plate. If the fish-plate is of metal I make the serrated surface thereon in one piece with it, but if it is of wood I fasten onto it a serrated metallic washer, between which and the nut I place an elastic washer, in a manner as above named.

Figure 1:
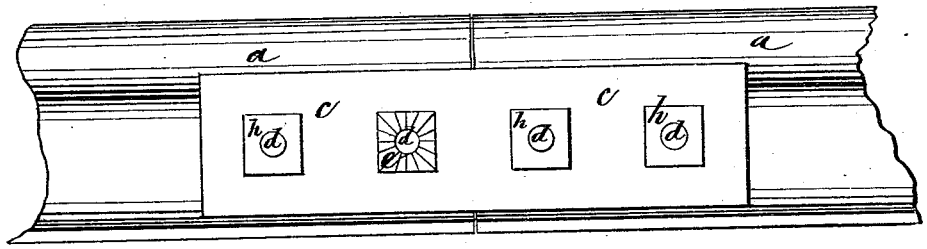
Figure 3:
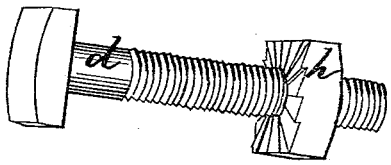
Figure 2:
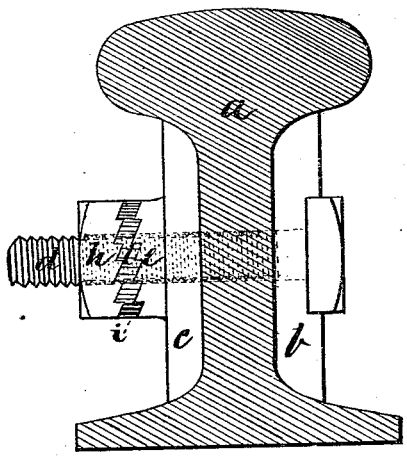
Figure 4:
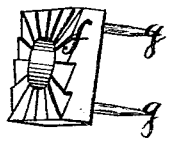

On the drawings, Figure 1 represents a side elevation of my invention. Fig. 2 represents an end view. Fig. 3 represents a perspective view of the bolt and nut, and Fig. 4 represents a perspective view of the improved serrated washer used on wooden fish-plates or other wooden articles.

Similar letters refer to similar parts wherever they occur on the drawings.

$a$ $a$ represent ordinary rails, and $b$ $c$ represent the fish-plates by which the ends of the rails are joined together. The plate $b$ is made with a horizontal groove, in the usual manner, in which the heads of the fastening-bolts $d$ $d$ $d$ rest, and are prevented from turning. The fish-plate $c$ is provided with serrated projections $e$ $e$, one for each fastening-bolt. If the fish-plate is of metal I make the said serrated or toothed projections $e$ $e$ in one and the same piece with the fish-plate $c$, but if the said fish-plate is made of wood I substitute for them serrated or toothed washers $f$, as shown in Fig. 4, which serrated washers are provided with projecting points or pins $g$ $g$ that are driven in the wood, so as to prevent said washers from turning round by continuous jarring of the rail. The nuts $h$ $h$ for the bolts $d$ $d$ are provided on their under sides with serrated teeth, as shown in Figs. 2 and 3. Between the serrated surfaces of the projections $e$ $e$ and the nuts $h$ $h$ I place elastic washers $i$, as shown in Fig. 2. In this manner I am able to compress the elastic washer $i$ between the serrated surfaces of the projection $e$ and nut $h$, when the latter is turned around the bolt $d$, so that, no matter how much the rail, fish-plate, and nuts are jarred, it will be impossible for the nut to work loose, on account of the great friction between the sides of the elastic washer $i$ and the aforesaid serrated surfaces of the projection $e$ and nut $h$.

It is obvious from the above that this my invention may be equally advantageous for the purpose of securing nuts and bolts together to any other articles besides fish-plates for rails, where it may be desirable to prevent nuts from working loose on account of jars or blows.

Having thus fully described the nature, construction and operation of my invention, I wish to secure by Letters Patent, and claim—

The combination with the fish-plate $c$ or washer $f$, provided with the rigid serrations or teeth $e$, of the bolt $d$, serrated nut $h$, having its teeth cut in opposite directions from those on the fish-plate, and the elastic washer $i$, arranged between the nut and serrations on the fish-plate or washer, as and for the purposes described.

In testimony that I claim the foregoing as my own I have affixed my signature in presence of two witnesses.

CHARLES L. HOLLAND.

Witnesses:
 ALBAN ANDRÈN,
 JOHN R. HEARD.